3,299,160
METHOD FOR SEPARATING MYRCENE FROM OCIMENE

Jerome S. Luloff, East Paterson, and Morris Dunkel, Paramus, N.J., assignors to Universal Oil Products Company, Des Plaines, Ill., a corporation of Delaware
No Drawing. Filed Mar. 24, 1966, Ser. No. 537,006
10 Claims. (Cl. 260—677)

This invention relates to a method for separating myrcene from ocimene. More particularly this invention relates to a method for separating myrcene from ocimene admixed with other terpenes which involves forming a readily separable Diels-Alder adduct of the myrcene.

Ocimene is a triethylenic hydrocarbon having highly desirable odor properties which render it of great value in the perfume industry. It is found in nature as a component of several essential oils such as French lavender oil, but generally it is more advantageously obtained by pyrolysis of alpha-pinene or dehydration of linalool. While the odor properties of ocimene have long been recognized, it has, nevertheless, not generally been widely utilized in perfumery. The principal reason limiting, if not precluding, the use of this valuable compound in perfumery is that it is almost always obtained in admixture with myrcene which possesses an objectionable odor which severely detracts from and masks the desirable odor properties of the ocimene. While various separational techniques, for example distillation, may be employed to remove the myrcene from the ocimene, such techniques have not generally been successful because either the cost involved is excessive or, as is more frequently the case, a substantial portion of the valuable ocimene is destroyed during the separation by polymerization or by conversion to other valueless and detrimental products such as allo-ocimene or even myrcene. It has now been discovered, however, that myrcene may be simply and effectively separated from ocimene and moreover even in the presence of other terpenes, such as linalool or alpha-pinene, by forming a Diels-Alder adduct of myrcene which is then readily separated from the ocimene.

Accordingly, an object of this invention is to provide a method for separating myrcene from ocimene. Another object is to provide a method for separating myrcene from ocimene admixed with other terpenes without substantial destruction or loss of the ocimene by forming a Diels-Alder adduct of myrcene which is readily separated from the ocimene. A still further object is to provide a method for separating myrcene from ocimene whereby a linalool mixture containing ocimene substantially free of myrcene is obtained having unique perfume utility. These and other objects of this invention will be apparent from the following further detailed description thereof.

The separation of myrcene from ocimene according to this invention is effected, in general, by first forming a Diels-Alder adduct of myrcene followed by removing the adduct from the ocimene. While the treatment of essential oils by Diels-Alder reaction, either for identification or isolation of certain of the components thereof, has long been known, it is quite surprising that myrcene can be effectively separated from ocimene using such method as both compounds form adducts and, in fact, upon theoretical considerations of the two compounds, ocimene would normally be expected to react at about the same rate or even more rapidly in adduct formation. Such separation can be effected, however, using the Diels-Alder reaction and, more over, with high efficiency and with little or no loss of the valuable ocimene by effecting the separation according to the precise conditions and procedures of the method of this invention. Even more surprising, however, is that not only can the myrcene be effectively separated from the ocimene using Diels-Alder reaction, but such separation may even be effected in the presence of substantial quantities of other terpenic materials, for example linalool, which normally would be expected to hinder and preclude separation by Diels-Alder adduct formation.

The Diels-Alder reaction used in the method of this invention consists basically of a 1,4-addition of an unsaturated compound containing an olefinic double or triple band to a conjugated diene. In this reaction, the unsaturated compound is referred to as a dienophile and the product of the reaction is referred to as an adduct. The dienophile which may be used in the Diels-Alder reaction phase of the method of this invention may comprise any of the well known compounds used in this type of reaction which will react with myrcene. Included within this group are such compounds as maleic anhydride, maleic acid, lower alkyl substituted maleic anhydride or acid, acetylene dicarboxylic acid, acetylene dicarboxylic esters, crotonaldehyde, or acrolein. The results achieved with the different dienophiles in effectively separating myrcene from ocimene without destruction of the ocimene will vary widely, however, and of the various dienophiles which may be used in the method of this invention, the best results in respect to maximizing the degree of separation and minimizing any destruction of the ocimene are generally achieved when using maleic anhydride. This compound is accordingly the preferred dienophile for use in the method of this invention, particularly when the separation is effected in the presence of other terpenic materials such as linalool.

In the method of this invention the conditions and procedures used, and particularly those used in the Diels-Alder reaction phase of the separation, are very important as any substantial variation therefrom will result both in poor ultimate separation of the myrcene and partial destruction of the ocimene. In the first phase of the separational method, namely the Diels-Alder reaction of the myrcene and the dienophile, it is essential to the success of the ultimate separation of the myrcene to use an excess of the dienophile above the stoichiometric amount of one mol of dienophile per mol of myrcene. The use of a quantity of dienophile below excess or the use of an excess above a certain level will normally result either in unsatisfactory ultimate separation or destruction of part of the ocimene. The particular level of excess utilized will vary depending upon such factors as the reaction temperature, the dienophile used and whether the separation is effected in the presence of substantial quantities of other terpenic materials such as linalool or alpha-pinene. When the dienophile is reacted at the preferred temperature range, as hereafter described, the quantity may range from about 2 to 5 mols of dienophile per mol of myrcene with about 3 to 4 mols of dienophile per mol of myrcene being more preferably used for maximum ultimate separation. When the adduct formation is effected in the presence of other terpenic materials such as linalool, the level of excess used should be increased to account for any interaction of the dienophile and the terpenic materials present. For example, the generally acceptable range of dienophile used under such circumstances will be about 2 to 7 mols of dienophile per mol of myrcene with a range of from about 5.5 to 6.5 mols per mol of myrcene being more preferably used.

The temperature used in combination with the above described excess quantity of dienophile in the Diels-Alder phase of the separation is equally important upon the success of the ultimate separation obtained as the use of too high a temperature will generally result in destruction of part of the ocimene and the use of too low a temperature will usually not achieve the desired adduct formation. The particular temperature used and the success thereof in achieving maximum ultimate separation will depend upon various factors, for example the particular dienophile used. Generally, when a dienophile such as maleic anhydride is used, the temperature may range from about 65° C. to 115° C. with a more limited range of about 75° C. to 85° C. being more preferred. While it is not essential to effect the Diels-Alder reaction in the presence of a solvent, the results are generally improved when a solvent is utilized and particularly a solvent which will solubilize the dienophile reactant. Suitable solvents for this purpose include aromatic hydrocarbons such as benzene, toluene or a xylene. The quantity of solvent is not important but it should, at least, be sufficient to provide a readily stirrable mixture. Generally, an acceptable quantity of solvent may range from about an equal weight of solvent based upon the weight of the dienophile used to about 10 weight parts of solvent per one weight part of dienophile. In effecting the Diels-Alder reaction, it is generally preferred to conduct it in the absence of air so as to prevent any destruction of the ocimene by oxidation. The duration of the reaction is also an important factor in achieving desirable separation and is dependent upon such variable factors as the quantity of myrcene and dienophile present and particularly the temperature utilized. In all cases, however, it is important that lengthy reaction times be avoided to prevent any unnecessary destruction of the ocimene by reaction with the dienophile. Generally, when the reaction is effected according to the above critical conditions of temperature and ratio of reactants, and in a batch-type operation, the reaction period may range from about 15 minutes to 3 hours with a period of about 15 minutes to 1.5 hours being preferred for maximum ultimate separation.

After formation of the adduct of myrcene and dienophile has been achieved, the adduct is removed from the reaction mixture to complete the separation. This may be accomplished in several ways with the results obtained varying somewhat depending upon the particular isolation method utilized. While the most direct method is to distill the ocimene from the higher boiling adduct, the temperatures required frequently result in decomposition or destruction of part of the ocimene with concomitant formation of undesirable products which severely detract from the odor value of the remaining ocimene. A far more desirable procedure, however, which achieves removal of the adduct without simultaneously unfavorably affecting the ocimene, and which is the preferred removal procedure of the method of this invention, is to first form a water soluble salt of the adduct which may then be readily separated from the organic, ocimene-rich phase of the reaction mixture as a solute dissolved in a nonmiscible water phase thereof.

The formation of the adduct salt may be effected simply and readily by reacting the adduct with any basic material which will form a water soluble salt thereof. Suitable reactants for this purpose comprise alkali metal hydroxides or carbonates such as sodium or potassium hydroxides or carbonates. Preferably, such reactants are added to the Diels-Alder reaction mixture in aqueous solution for ease of handling and as a ready means of providing the water necessary for the separation. The conditions used in achieving the salt formation are not critical with the only major limitation being that the reaction mixture should be maintained at a relatively low temperature of from about 20° to 60° C. with adequate cooling so as to prevent any excessively high localized temperature resulting from the exothermic nature of the reaction. Once the salt has been formed, it may readily be separated from the reaction mixture by simply removing the aqueous phase of the mixture containing the salt by such methods as decantation. The remaining ocimene-rich, organic phase of the reaction, which is substantially free of the myrcene, may then be treated by distillation, for example, to remove the solvent, if one is used, and any undesirable impurities to recover the valuable ocimene either alone or, if desired, in admixture with any of the other terpenic materials initially present in admixture with the myrcene and ocimene, for example, linalool.

As hereinbefore indicated, a particularly unique characteristic of the method of this invention is that myrcene can be effectively separated from ocimene even when both are admixed with other terpenic materials such as linalool or alpha-pinene. This is quite surprising as it normally would be expected that such terpenic materials would also react with the dienophile forming objectionable materials which could interfere with ultimate effective separation of the myrcene. Such is not the case, however, when the adduct formation is effected according to the method of this invention with the result that the ultimate separation is readily and effectively achieved. Aside, however, from being rather unexpected, this unusual characteristic results in the obtainment of a unique procedure for obtaining a highly valuable perfumery material consisting of a mixture of linalool and ocimene. This mixture can be used directly as the basis of a synthetic replacement for the extremely valuable, naturally occurring, lavendin oil which is composed, in part, of an admixture of linalool and ocimene. Obtainment of this valuable mixture may be readily achieved by combining the separational method of this invention with one of the presently used preparational methods for obtaining ocimene. For example, as previously indicated, one standard procedure for obtaining ocimene is to dehydrate linalool. The product of this preparation comprises, in addition to unreacted linalool, the ocimene in admixture with myrcene. This product can thus be readily treated in total according to the separational method of this invention to remove the myrcene without destruction of the ocimene, and moreover with little or no loss of the linalool, to obtain the valuable perfumery mixture of linalool and ocimene substantially free of myrcene.

In carrying out the method of this invention, the separation may be effected in either a batch- or continuous-type procedure. For example, in a batch-type procedure ocimene admixed with myrcene and possibly other terpenic materials such as linalool and also a solvent, if one is used, are charged to a suitable reaction vessel equipped with heating, cooling and mixing means and preferably means for maintaining an inert oxygen-free atmosphere aver the reaction mixture. After the air in the vessel has been replaced by an inert gas, for example nitrogen, the temperature of the mixture is then raised to the desired range for the Diels-Alder reaction. Since the addition of maleic anhydride is exothermic, however, it is generally preferable to add the dienophile slowly to the mixture at a low temperature and after the addition is complete to then gradually raise the temperature to the desired range. The temperature of the mixture is then maintained for a period of time sufficient to complete the adduct formation. Prior to the adduct salt formation, and because of the exothermic nature of such formation, the reaction mixture is preferably cooled and the water soluble, salt forming reactant, for example an aqueous caustic solution, is gradually added to the precooled mixture with sufficient cooling to maintain a relatively low temperature. The resulting reaction mixture is then allowed to stand and separate into aqueous and organic phases. The aqueous phase containing the adduct salt is then withdrawn from the organic phase containing the ocimene. The organic phase is then distilled to remove the solvent, if one is used, and any impurities to recover the ocimene. If the initial ocimene containing charge contained substantial quantities of other terpenic materials such as linalool, the distillation may be continued to obtain the ocimene alone or, when a mixture of linalool and ocimene is desired, the distillation may be stopped after the solvent and impurities are removed.

The following examples are cited to illustrate the separational method of this invention, but they are not intended to limit the invention to the particular conditions or techniques recited therein:

*Example I*

Myrcene was separated from ocimene by the method of this invention according to the following procedure:

To a reaction flask equipped with heating, cooling and stirring means and means for maintaining an atmosphere of nitrogen therein, was charged a benzene solution of myrcene and ocimene. This mixture analyzed by vapor phase chromatography (V.P.C.), aside from the benzene, as containing 28.3 weight percent (0.21 mol) of myrcene and 71.6 weight percent (0.53 mol) ocimene (both cis and trans isomers). With the temperature of the mixture at about 20° C. and with an atmosphere of nitrogen maintained in the flask, about 75 grams (0.75 mol) of maleic anhydride were added and the temperature raised to about 75° to 80° C. and maintained thereat for about one hour. The mixture was then cooled to about 32° C. and about 80 grams of sodium hydroxide in 450 milliliters of water were added with the temperature maintained below 55° C. by cooling. The resulting aqueous layer was separated from the resulting organic layer by decantation and extracted with benzene. The benzene extract was combined with the organic layer and the combined organic mixture washed with water and distilled first at atmospheric pressure and then at about 70 mm. Hg pressure to remove the benzene and impurities. The remaining mixture was then distilled at 55 mm. Hg to recover the ocimene product analyzing by V.P.C. as 5.4 weight percent myrcene and 94.6 percent ocimene.

*Example II*

Myrcene was separated from ocimene contained in a linalool mixture by the method of this invention according to the following procedure:

To a reaction flask equipped with heating, cooling and stirring means and means for maintaining an atmosphere of nitrogen therein, was charged a benzene solution containing linalool, myrcene and ocimene. This mixture analyzed by vapor phase chromatography (V.P.C.), aside from benzene, as containing about 6.1 weight percent (0.33 mol) of myrcene, about 8.9 weight percent (0.48 mol of ocimene (both cis and trans isomers) and about 85 weight percent (4.0 mols) of linalool. With the temperature of the mixture at about 45° C. and with an atmosphere of nitrogen maintained in the flask about 200 grams (2.0 mols) of maleic anhydride were added and the temperature raised to about 80° C. and maintained thereat for about one hour. The mixture was then cooled to about 20° C. and about 200 grams of sodium hydroxide in about 2500 milliliters of water were added. After stirring for about 15 minutes the mixture was allowed to settle into aqueous and organic layers. After separating the aqueous layer by decantation, the organic layer was water washed and then distilled first at atmospheric pressure and then at about 25 to 30 mm. Hg to remove the benzene solvent and impurities. The remaining mixture analyzed (by V.P.C.) as containing about 0.5 weight percent of myrcene, about 5 weight percent ocimene (both cis and trans isomers), the remainder being linalool. This mixture was observed to have an odor rendering it highly suitable for direct use in preparing a synthetic lavendin oil.

We claim as our invention:

1. A method for separating myrcene from ocimene which comprises: (A) reacting the myrcene with a dienophile; (B) removing the resultant adduct of the myrcene and the dienophile from the reaction mixture; and (C) recovering the ocimene from the reaction mixture substantially free from myrcene.

2. The method according to claim 1 wherein the myrcene is separated from ocimene contained in a linalool mixture.

3. The method according to claim 1 wherein the dienophile is reacted with the myrcene in excess within the range of from about 2 to 5 mols per mole of myrcene present and the reaction is effected at a temperature of from about 65° to 115° C.

4. The method according to claim 1 wherein the dienophile is maleic anhydride.

5. The method according to claim 1 wherein the adduct of the myrcene and the dienophile is removed from the reaction mixture by first forming a water soluble salt of the adduct followed by separation of the resulting aqueous phase containing said salt from the reaction mixture.

6. The method according to claim 2 wherein the dienophile is maleic anhydride.

7. The method according to claim 6 wherein the maleic anhydride is reacted with the myrcene in excess within the range of from about 2 to 7 mols per mole of myrcene and the reaction is effected at a temperature of from about 65° C. to 115° C.

8. The method according to claim 7 wherein the maleic anhydride is reacted with the myrcene in excess within the range of from about 5.5 to 6.5 mols per mol of myrcene and the reaction is effected in the presence of a solvent at a temperature of from about 75° C. to 85° C.

9. The method according to claim 7 wherein the adduct of maleic anhydride and myrcene is separated from the reaction mixture by first forming a water soluble salt of the adduct followed by removal of the resulting aqueous phase containing said salt from the reaction mixture.

10. The method according to claim 1 wherein myrcene is separated from ocimene contained in a lanalool mixture which comprises: (A) reacting the myrcene in the presence of benzene with an excess of maleic anhydride in an amount of from about 5.5 to 6.5 mols of anhydride per mol of myrcene at a temperature of from about 75° to 85° C. for from about 0.5 to 1.5 hours; (B) removing the resultant adduct of maleic anhydride and myrcene from the reaction mixture by first forming a water soluble salt of the adduct followed by separating the resulting aqueous phase containing said salt from the reaction mixture; and (C) recovering the ocimene contained in the linalool mixture from the remaining reaction mixture substantially free from myrcene.

References Cited by the Examiner

Chem. Berichte 93, 973–8 (1960).

DELBERT E. GANTZ, *Primary Examiner.*

G. E. SCHMITKONS, *Assistant Examiner.*